United States Patent
Hawthorn et al.

(10) Patent No.: US 6,799,777 B2
(45) Date of Patent: Oct. 5, 2004

(54) APPARATUS AND METHODS OF VENTING GAS IN AN AIRBAG MODULE

(75) Inventors: Laura A. Hawthorn, Tipp City, OH (US); Stephanie Dunkle, Springboro, OH (US); Mark T. Winters, Troy, OH (US); Shawn G. Ryan, Dayton, OH (US); Ann L. Kneisly, Dayton, OH (US); John P. Sparkman, Dayton, OH (US); Patrick W. Schatz, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 138 days.

(21) Appl. No.: 10/295,534

(22) Filed: Nov. 15, 2002

(65) Prior Publication Data

US 2004/0094940 A1 May 20, 2004

(51) Int. Cl.[7] .............................................. B60R 21/26
(52) U.S. Cl. ........................ 280/742; 280/738; 280/739
(58) Field of Search ................................ 280/739, 742, 280/738, 736

(56) References Cited

U.S. PATENT DOCUMENTS

| | | | |
|---|---|---|---|
| 5,207,450 A | * 5/1993 | Pack et al. ................... 280/738 |
| 5,226,670 A | * 7/1993 | Wright et al. ............... 280/738 |
| 5,232,243 A | 8/1993 | Blackburn et al. .......... 280/732 |
| 5,366,242 A | * 11/1994 | Faigle et al. ................ 280/736 |
| 5,433,475 A | * 7/1995 | Kokeguchi .................. 280/736 |
| 5,707,078 A | 1/1998 | Swanberg et al. .......... 280/739 |
| 5,792,976 A | 8/1998 | Genovese ................... 102/293 |
| 5,864,295 A | 1/1999 | Jarocha ....................... 340/667 |
| 5,984,351 A | 11/1999 | Pierotti et al. .............. 280/736 |
| 6,039,346 A | 3/2000 | Ryan et al. ................. 280/736 |
| 6,050,601 A | 4/2000 | Pantke et al. ............... 280/742 |
| 6,123,358 A | * 9/2000 | Ryan et al. ................. 280/739 |
| 6,161,866 A | 12/2000 | Ryan et al. ................. 280/736 |
| 6,203,061 B1 | 3/2001 | Niederman et al. |
| 6,213,502 B1 | 4/2001 | Ryan et al. ................. 280/736 |
| 6,247,726 B1 | 6/2001 | Ryan .......................... 280/739 |
| 6,371,517 B1 | 4/2002 | Webber et al. |
| 6,390,501 B1 | 5/2002 | Greib et al. |
| 6,409,213 B2 | * 6/2002 | Webber et al. ............. 280/739 |
| 6,422,597 B1 | 7/2002 | Pinsenschaum et al. |
| 6,431,596 B1 | 8/2002 | Ryan et al. |
| 6,435,549 B1 | * 8/2002 | Ochiai ........................ 280/735 |
| 6,439,603 B2 | * 8/2002 | Damman et al. ........... 280/736 |
| 6,499,765 B2 | 12/2002 | Hawthorn et al. |
| 6,561,545 B2 | 5/2003 | Greib et al. |
| 6,592,146 B2 | 7/2003 | Pinsenschaum et al. |
| 2001/0035637 A1 | 11/2001 | Thomas et al. ............. 280/736 |

FOREIGN PATENT DOCUMENTS

WO    WO 97/34785    9/1997    .......... B60R/21/26

* cited by examiner

Primary Examiner—Paul N. Dickson
Assistant Examiner—Deanna Draper
(74) Attorney, Agent, or Firm—Scott A. McBain

(57) ABSTRACT

An airbag module is provided. The module includes a housing, an inflator, an inflatable cushion, a vent aperture defined in the housing, and a gas deflecting member. The vent aperture places the interior of the housing in fluid communication with the exterior of the housing. The vent aperture is offset from exhaust ports of the inflator. The gas deflecting member is movable between a first position and a second position. In the first position, a first portion of the deflecting member deflects a first amount of the inflation gas to the exterior of the housing. In the second position, a second portion of the deflecting member deflects the inflation gas towards the inflatable cushion. A second amount of the inflation gas is ventable from the housing through the vent aperture when the deflecting member is in the second position.

20 Claims, 4 Drawing Sheets

APPARATUS AND METHODS OF VENTING GAS IN AN AIRBAG MODULE

TECHNICAL FIELD

This disclosure relates generally to airbag modules. More specifically, this disclosure relates to apparatus and methods of venting gas in an airbag module.

BACKGROUND

Airbag modules can be found in many modern automobiles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, thus, deploying it from the housing into a desired position.

SUMMARY

An airbag module is provided. The module includes a housing, an inflator, an inflatable cushion, a vent aperture defined in the housing, and a gas deflecting member. The inflator has exhaust ports in fluid communication with an interior of the housing. The inflatable cushion is in fluid communication with the interior of the housing such that the inflator is in fluid communication with the inflatable cushion and deploys the inflatable cushion when activated. The vent aperture when unblocked places the interior of the housing in fluid communication with the exterior of the housing. The vent aperture is offset from the exhaust ports such that inflation gas from the inflator is not directed in line with the vent aperture. The gas deflecting member is movable between a first position and a second position. A first portion of the gas deflecting member deflects a first amount of the inflation gas to the exterior of the housing through the vent aperture when the gas deflecting member is in the first position. A second portion of the gas deflecting member deflects the inflation gas towards the inflatable cushion when the gas deflecting member is in the second position. A second amount of the quantity of inflation gas is ventable from the housing through the vent aperture when the gas deflecting member is in the second position. The second amount is less than the first amount.

A method of varying an inflation level of an airbag module's inflatable cushion is also provided. The method includes deflecting an inflation gas by moving a gas deflecting member between a first position and a second position. A first portion of the gas deflecting member deflects a first amount of the inflation gas from the airbag module through a vent aperture when the gas deflecting member is in the first position. A second portion of the gas deflecting member deflects the inflation gas towards the inflatable cushion when the gas deflecting member is in the second position. A second amount of the inflation gas is ventable through the vent aperture when the gas deflecting member is in the second position. The first amount is greater than the second amount.

The above-described and other features of the present disclosure will be appreciated and understood by those skilled in the art from the following detailed description, drawings, and appended claims.

BRIEF DESCRIPTION OF THE FIGURES

The present invention will now be described, by way of example, with reference to the accompanying drawings, in which.

DESCRIPTION OF THE PREFERRED EMBODIMENT

Figure 1:
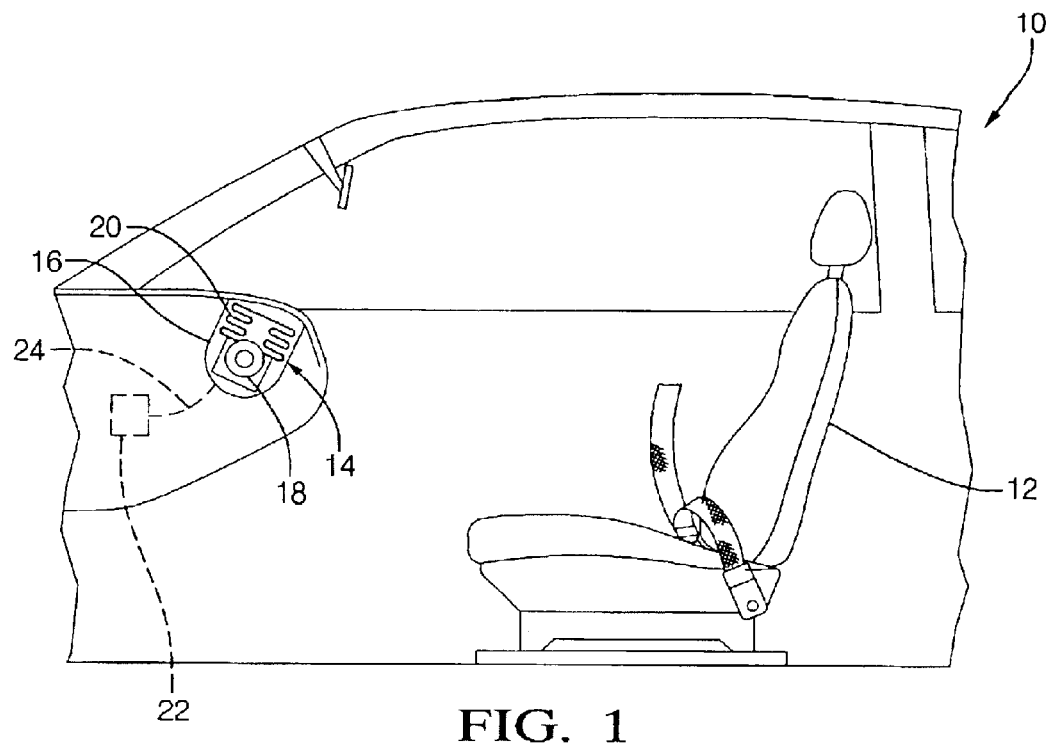
FIG. 1 is a partial view of a vehicle depicting an exemplary location of an airbag module.

Referring now to the Figures and in particular to FIG. 1 a portion of an interior compartment of a vehicle 10 is illustrated. Included in the interior compartment are a seating structure 12 and an airbag module 14. The airbag module is disposed in a selected spatial relationship with respect to the seating structure. Airbag module 14 comprises a housing 16, an inflator 18, and an inflatable airbag or cushion 20. The module 14 is positioned in the vehicle 10 for deployment of the cushion 20 towards the seating structure 12.

In accordance with known technologies, a sensor or sensing-and-diagnostic module 22 is adapted to detect an activation event to provide an activation signal 24 to the inflator 18. The detection of the activation event can be determined by one or more sensors disposed about the vehicle.

Prior to deployment, the cushion 20 is stored in a folded or un-deployed configuration within the housing 16, and is in fluid communication with the inflator 18. Accordingly, inflation gas from the inflator can inflate the cushion as desired. Upon detection of an activation event by the sensing-and-diagnostic module (SDM) 22 or other detection means, an activation signal 24 is supplied to the inflator 18. The activation signal 24 causes the inflator 18 to generate and/or release a quantity of inflation gas. The inflation gas causes the cushion 20 to inflate and expand from the housing 16 into the interior of the vehicle 10. It should be recognized that the module 14 is illustrated by way of example only as being included in the dashboard of the vehicle 10. Of course, it is contemplated that the module 14 can be installed for deployment in other regions of the vehicle 10, such as, but not limited to the steering wheel, the seat, the A-pillar, the roof, and other locations as well as other angular configurations shown in the attached figures.

Referring now to FIGS. 2–7, various exemplary embodiments of airbag modules adapted to provide more than one level of inflation to the cushion are illustrated.

Figure 2:
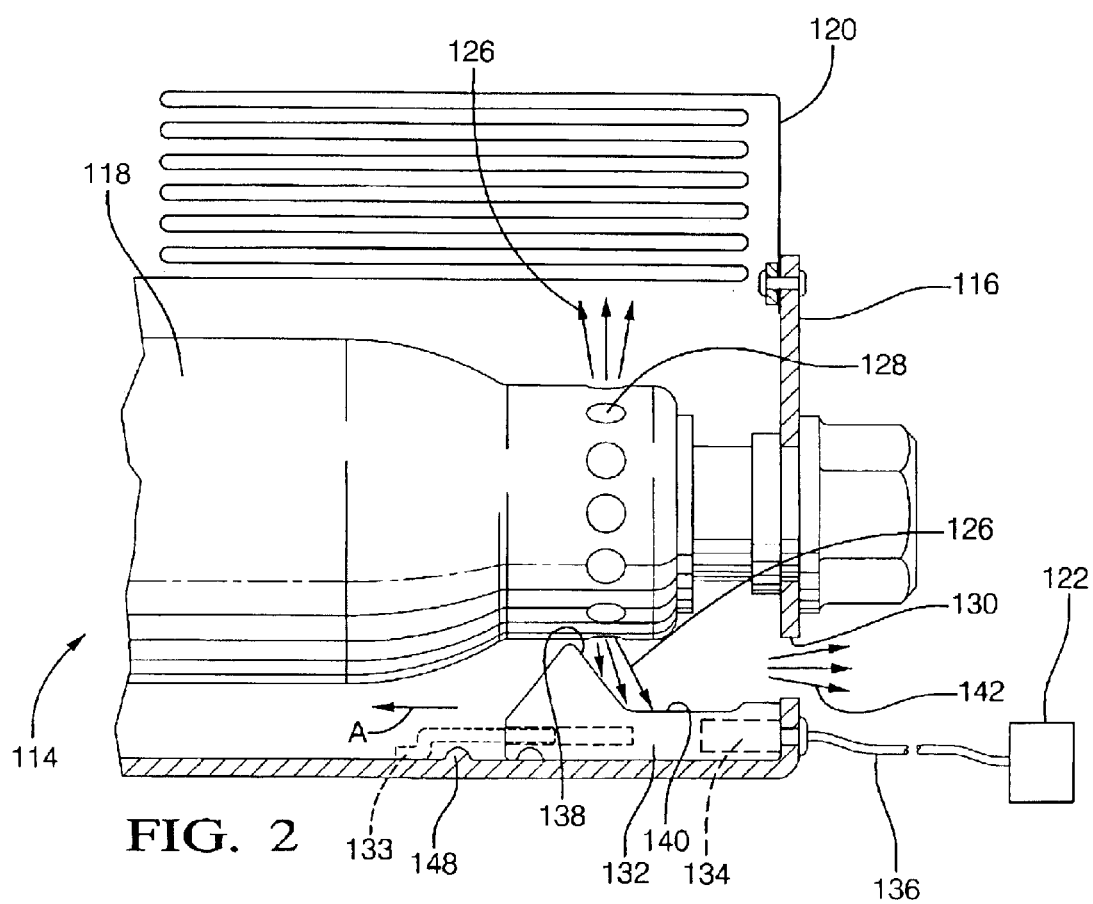
FIG. 2 is a cross sectional view of an exemplary embodiment of an airbag module showing a deflector in a first position.
Figure 3:
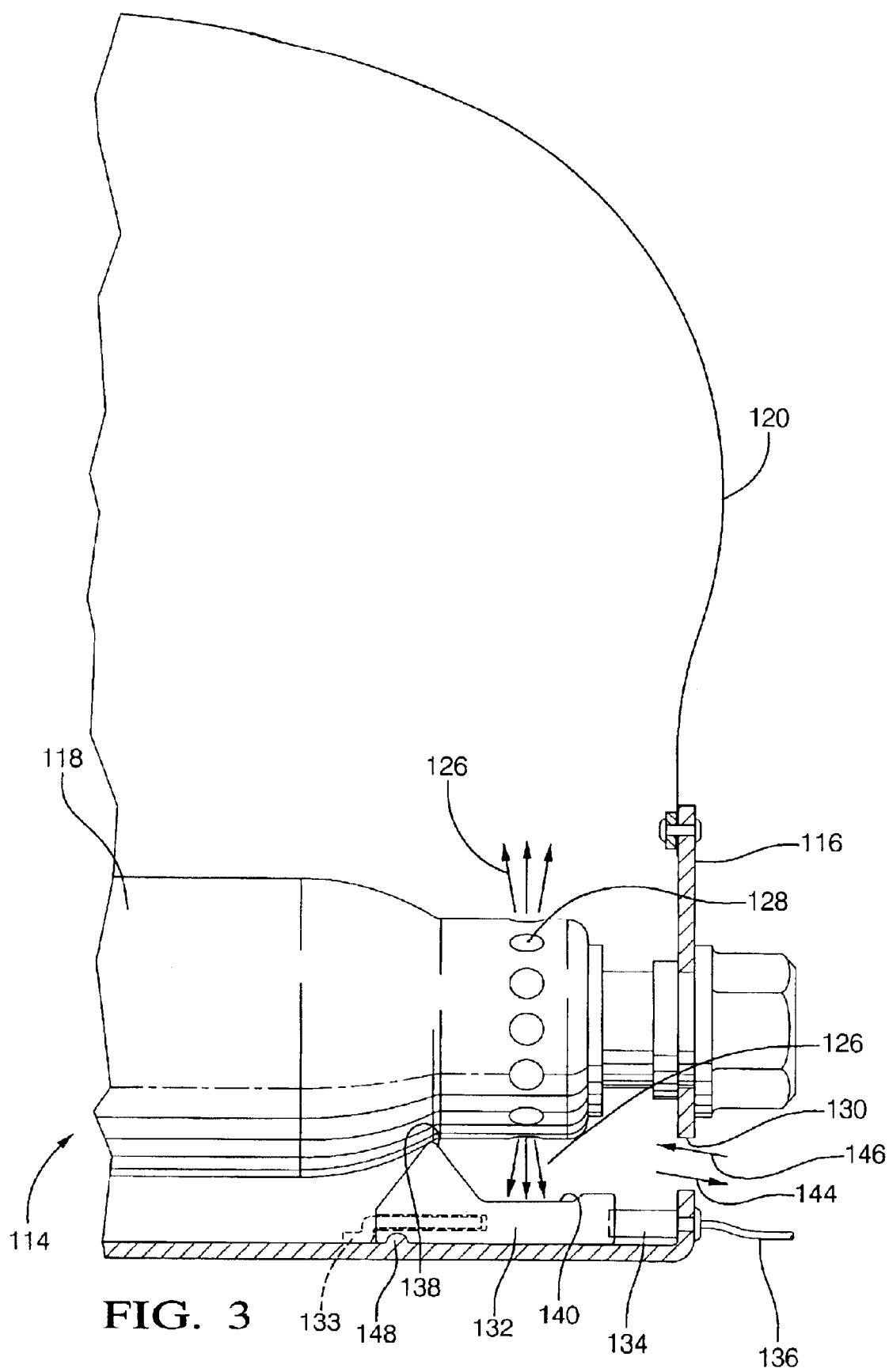
FIG. 3 illustrates the module of FIG. 2 showing the deflector in a second position.

A first exemplary embodiment of an airbag module 114 is illustrated in FIGS. 2–3. The airbag module 114 comprises housing 116, inflator 118, and inflatable cushion 120. The inflator 118 is configured to release a quantity of inflation gas 126 from a plurality of exhaust ports 128 disposed thereon. The housing 116 comprises one or more vent apertures 130 and a gas deflecting member 132.

The inflator 118 is installed within housing 116 such that exhaust ports 128 are not aligned with vent apertures 130. Specifically, the inflation gas 126 exiting the exhaust ports 128 of inflator 118 is not directed towards vent apertures 130. In the illustrated embodiment, the vent apertures 130 are angularly offset from the exhaust ports 128 by about ninety degrees. Of course, larger or smaller offsets are contemplated for use with the present disclosure.

The gas deflecting member 132 is slidably engaged with the housing 116. For example, gas deflecting member 132 is configured to be slidably received within a channel or features formed into housing 116. In addition, gas deflecting member 132 is also configured to have complimentary features for slidably engaging the features of housing 116. For example, a channel having notched sidewalls is disposable with a surface of housing 116 wherein a portion of the gas deflecting member is slidably received therein. In addition, and as an alternative the notched sidewalls are configured to slidably engage features formed on the sides of the gas deflecting member. In yet another alternative embodiment and as illustrated by the dashed lines in FIGS. 2 and 3, a guide member is secured to the housing at one end and is configured to be slidably received with an opening in the gas deflecting member at the other end. Guide member 133 will provide a means for guiding the gas deflecting member as it is being manipulated by an actuator 134. Thus, the gas deflecting member 132 is movable in the direction of arrow A between a first position (FIG. 2) and a second position (FIG. 3). The gas deflecting member 132 also comprises a first portion 138 and a second portion 140.

In the first position, the gas deflecting member 132 is positioned such that at least some of the inflation gas 126 exiting the exhaust ports 128 is directed towards the first portion 138. The first portion 138 deflects a first amount 142 of the inflation gas 126 from the housing 116 through the vent apertures 130. For example, the first portion 138 can comprise an angled portion configured to deflect the first amount 142 through the vent apertures 130. Thus, the inflation gas that is directed towards the first portion 138 is deflected by the first portion through the vent apertures and away from the cushion 120. By deflecting the first amount 142 of the inflation gas away from the cushion 120, the module 114 provides a first level of inflation when the gas deflecting member is in the first position.

In the second position, the gas deflecting member 132 is positioned such that at least some of the inflation gas 126 exiting the exhaust ports 128 is directed towards the second portion 140. The second portion 140 deflects the inflation gas towards the cushion 120. For example, the second portion 140 can comprise a curved portion that guides the inflation gas 126 around the inflator 118 and into the cushion 120. A second amount 144 of the inflation gas 126 can vent from the housing through the vent apertures 130 due to the pressure differential between the inside and the outside of the housing. Thus, the module 114 provides a second level of inflation by venting the second amount 144 of the inflation gas away from the cushion 120 when the gas deflecting member is in the second position.

The second amount 144 of inflation gas is less than the first amount 142. Namely, more of the inflation gas 126 is vented from the housing 116 when the gas deflecting member 132 is in the first position than when the gas deflecting member is in the second position. Thus, more of the inflation gas 126 is directed toward the cushion 120 when the gas deflecting member 132 is in the second position than when the gas deflecting member is in the first position. In this manner, the cushion 120 has a higher inflation level when the gas deflecting member 132 is in the second position than when the gas deflecting member is in the first position.

The second portion 140 can also be configured to allow the vent apertures 130 to act as an aspiration source during the inflation of the cushion 120. Specifically, the flow of the inflation gas 126 when the gas deflecting member 132 is in the second position can allow ambient air 146 to be drawn into the housing 116.

Accordingly and in this embodiment, the gas deflecting member 132 is configured to never completely close the vent apertures. Thus, the vent apertures allow at least some of the inflation gas to be vented from the housing 116 and away from the cushion 120 during the inflation of the cushion 120 regardless of the position of gas deflecting member 132.

As yet another alternative, the first portion 138 is configured to provide a surface to aid the actuator 134 in moving the gas deflecting member 132. Namely, the pressure of the inflation gas 126 directed toward the first portion 138 can translate into a force on the gas deflecting member in the direction of arrow A.

The module 114 also comprises an actuator 134 configured to move the gas deflecting member 132 between the first and second positions. The actuator 134 can be, for example, a pyrotechnic squib or a solenoid. In the example where the actuator 134 is a pyrotechnic squib, the squib can be positioned within a cavity formed in the gas deflecting member 132. Upon ignition of the squib, the pressure within the cavity causes the gas deflecting member to move in the desired direction. In the example where the actuator 134 is a solenoid, the solenoid can be configured to extend/retract a member of the solenoid, which is attached to the gas deflecting member. The extension/retraction of the member moves the gas deflecting member between the first and second positions. It should be noted that the actuator and gas deflecting member can be positioned and/or configured to either push or pull the gas deflecting member 132 to the desired position.

The actuator 134 is electrical communication with the sensing-and-diagnostic module 122 by way of electrical leads 136. The sensing-and-diagnostic module 122 can selectively activate the actuator 134 to move the gas deflecting member 132 as desired upon the detection of an activation event. The gas deflecting member 132 can be moved by the sensing-and-diagnostic module 122 between the first and second positions at the time of the activation event, or a selected time delay after the occurrence of the activation event. By varying the time that the deflector is moved as compared to the occurrence of the activation event, the module 114 can vary the inflation level. Namely, the SMD 122 can control the amount of inflation gas 126 that is vented from the housing 116 to more precisely control the level of inflation of the cushion 120 based on the conditions of the activation event, as well as the conditions present in the vehicle at the time of the activation event (e.g., seat belt in use, and the like).

As yet another alternative, the gas deflecting member can be repositioned prior to the activation event wherein the sensing-and-diagnostic module through the use of a plurality of sensors positioned around the vehicle provide a plurality of inputs to the sensing-and-diagnostic module and the sensing-and-diagnostic module determines whether to reposition the gas deflecting member.

In addition and in accordance with the present disclosure, and as an alternative embodiment, the sensing-and-diagnostic module is adapted to detect one or more conditions of the seating structure, for example, the sensing-and-diagnostic module can be adapted to detect one or more of the following: a load or amount of load (e.g., occupant weight) on the seating structure, a position of the seating structure, an angle of a portion of the seating structure with respect to another portion, the distance the seating structure is from the air bag module, and other data that is relevant to the deployment of the airbag by receiving input from a plurality of sensors disposed about the vehicle.

For example, the sensing-and-diagnostic module can receive inputs from one or more sensors such as, but not limited to, a seat position sensor, an optical scanner, a load sensor, a seat recline sensor, a seat belt use detection sensor, and a belt tensioning sensor. The sensors are positioned to provide input signals to the sensing-and-diagnostic module indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. The data inputs when compared to a look up table stored in the memory of the microprocessor or other readable format will allow the algorithm to determine whether a modified deployment is desired (e.g., tailoring of the airbag module by activating or not activating a system designed to modify the cushion deployment characteristics). The continuous sampling of the various sensors allows the sensing and diagnostic module to determine before an activation event (deployment) what type of deployment is desired. It is noted that the device and venting system of the present disclosure is contemplated for use with any combination of the aforementioned sensors and it is not intended to be limited by the specific types of sensors discussed above. For example, the system is capable of operating with a single sensor input (e.g., occupant weight) or a multitude of inputs (e.g., occupant weight, seat position, seat belt operation, occupant height, etc.). Thus, any combination of sensors and sensor inputs may be used in order to assist with the deployment of the airbag.

The seat position sensor detects the position or distance of seating structure with respect to air bag module. Similarly, the optical scanner can be used to detect the position of seating structure. The load sensor is disposed within the seating structure and can be used detect the load on the seating structure. Thus, sensor is capable of detecting the specific weight or load on a portion of the seating structure. The seat recline sensor can be used to detect the degree or angle to which an upper or back portion of the seating structure is reclined or positioned with respect to a lower or seat portion of seating structure. The seat belt use detection sensor can determine whether the seat belt is secured (e.g., buckled is inserted into its corresponding clasp). The seat belt tensioning sensor, alone or in combination with the load sensor, can also be used determine the load on the seating structure.

In an alternative exemplary embodiment also illustrated in FIGS. 2 and 3, the gas deflecting member of 132 and housing 116 include a locking feature 148. The locking feature 148 aids in holding the gas deflecting member in a desired position prior to and during deployment of the cushion.

For example, the locking feature 148 can be configured to secure the gas deflecting member 132 in the second position.

Here, the locking feature 148 on the housing 116 can comprise a protrusion configured for receipt into a complimentary depression in the gas deflecting member. When the member 132 is moved from the first position to the second position, the protrusion and depression mesh with one another to hold the member in the desired position.

In the illustrated embodiment of the airbag module 114, the gas deflecting member 132 is initially in the first position and is moved by sensing-and-diagnostic module 122 to the second position at the time of the activation event, or a selected time delay after the activation event. Of course, it should be recognized that it is also contemplated that the gas deflecting member 132 can be initially in the second position and to be moved to the first position.

Figure 4:
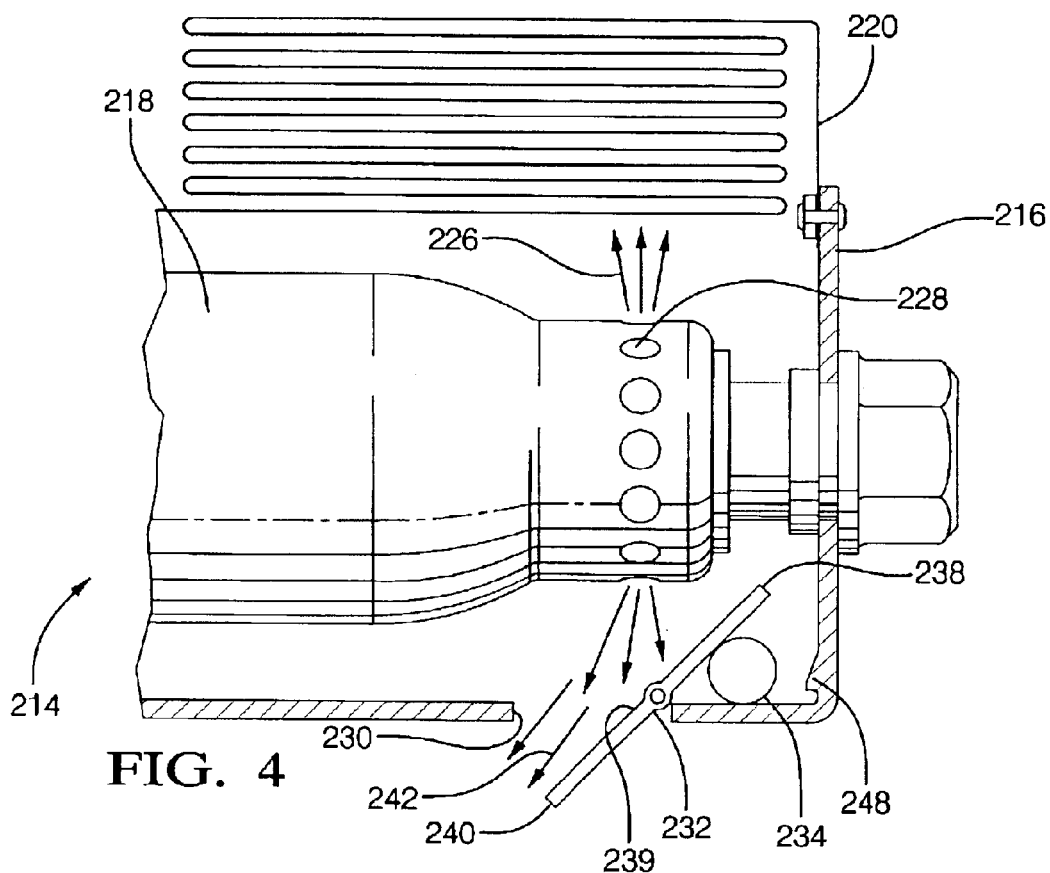
FIG. 4 is a cross sectional view of an alternative exemplary embodiment of an airbag module showing a deflector in a first position.
Figure 5:
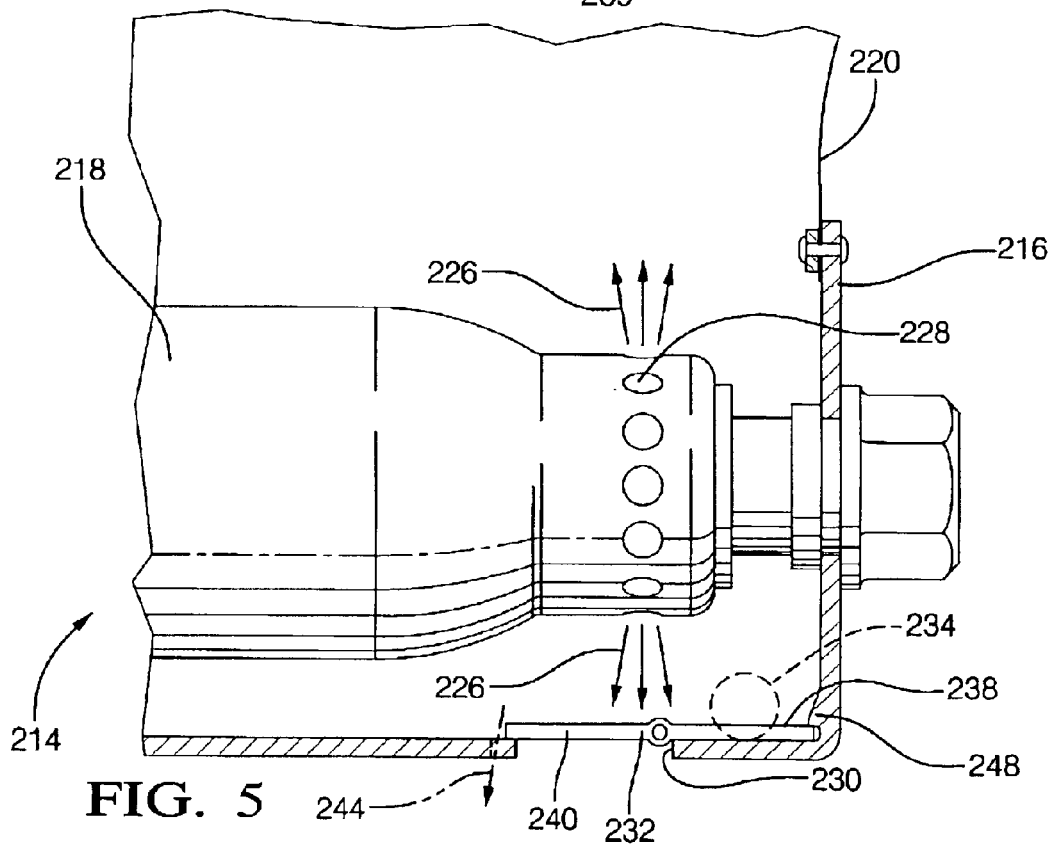
FIG. 5 illustrates the module of FIG. 4 showing the deflector in a second position.

Turning now to FIGS. 4–5, an alternative exemplary embodiment of an airbag module is illustrated here component parts performing similar or analogous functions are labeled in multiples of one hundred.

Airbag module 214 comprises housing 216, inflator 218, inflatable cushion 220, and gas deflecting member 232. The inflator 218 is configured to release a quantity of inflation gas 226 from a plurality of exhaust ports 228 disposed thereon. The housing 216 comprises one or more vent apertures 230.

The inflator 218 is installed within the housing 216 such that the exhaust ports 228 are not aligned with the vent apertures 230. Specifically, the inflation gas 226 exiting the exhaust ports 228 of inflator 218 is not directed towards vent apertures 230. In the illustrated embodiment, the vent apertures 230 are laterally offset from the exhaust ports 228.

The gas deflecting member 232 comprises a first portion 238 and a second portion 240 and is pivotally engaged to the housing 216. Specifically, gas deflecting member 232 is pivotable about a pivot axis (not shown) between a first position (FIG. 4) and a second position (FIG. 5).

When the gas deflecting member 232 is in the first position, the first portion 238 is proximate from the exhaust ports 228 and the second portion 240 is remote from the vent aperture 230. The inflation gas 226 exiting the exhaust ports 228 is directed towards the first portion 238 of the gas deflecting member. The first portion 238 deflects a first amount 242 of the inflation gas 226 from the housing 216 through the vent apertures 230. Thus, the gas deflecting member deflects the first amount 242 of the inflation gas from the housing and away from the cushion 220. By deflecting the first amount 242 away from the cushion 220, the module 214 provides a first level of inflation.

When the gas deflecting member 232 is in the second position, the first portion 238 is remote from the exhaust ports 228 and the second portion 240 closes the vent aperture 230. Thus, the inflation gas 226 from the exhaust ports 228 directed towards the gas deflection member 232 is deflected by the second portion 240 towards the cushion 220 to provide a second level of inflation. An alternative embodiment is also illustrated (in phantom) in FIG. 5. In this embodiment, when the gas deflecting member 232 is in the second position, the second portion 240 leaves a portion of the vent aperture 230 open such that a second amount 242 of the inflation gas is vented away from the cushion 220.

Accordingly, more of the inflation gas 226 is deflected to the cushion 220 when the gas deflecting member 232 is in the second position (FIG. 5) than when the gas deflecting member is in the first position (FIG. 4). In this manner, the module 214 provides the cushion 220 with a higher inflation level when the gas deflecting member 232 is in the second position than when the gas deflecting member is in the first position.

The module 214 also comprises an actuator 234. The actuator 234 is electrical communication with the sensing-and-diagnostic module so that the sensing-and-diagnostic module can selectively activate the actuator. The actuator 234 can be, for example, a pyrotechnic squib or a solenoid. When the gas deflecting member 232 is in the first position, a member of the actuator 234 is positioned between the first portion 238 of the deflector and the housing 216. The inflation gas 226 released from the inflator 218 acts on the first portion 238 of the gas deflecting member 232. The member of the actuator 234 between the first portion 238 and the housing 216 prevents the inflation gas 226 acting on the first portion 238 from pivoting the gas deflecting member from the first position. Thus, the gas deflecting member 232 deflects the amount 242 of the inflation gas 226 from the housing 216 (e.g., away from the cushion 220) through the vent apertures 230.

Upon the activation of the actuator 234, the member of the actuator positioned between the first portion 238 and the housing 216 is moved (e.g., retracted). The inflation gas 226 acts on the first portion 238 with a force sufficient to cause the gas deflecting member 232 to pivot to the second position. Namely, the inflation gas 226 causes the second portion 240 to close or restrict the vent aperture 230.

The gas deflecting member of 232 and/or housing 216 can also include a locking feature 248. The locking feature 248 is configured to secure the gas deflecting member 232 in the second position. For example, the locking feature 248 on the housing 216 can comprise a protrusion configured to receive a portion of the gas deflecting member 232. When the member 232 is pivoted from the first position to the second position, the first portion 238 of the gas deflecting member is received in the space between the protrusion and the wall of the housing to hold the member in the desired position.

Again, the airbag module 214 of the illustrated embodiment has the gas deflecting member 232 initially in the first position and being moved by the sensing-and-diagnostic module to the second position at the time of the activation event, or a selected time delay after the activation event. Of course, it should be recognized that it is also contemplated that the gas deflecting member can be initially in the second position and to be moved to the first position. For example, the member of the actuator can be positioned above the first portion to hold the member in the second position. Upon activation of the actuator, the member moves to allow the inflation gas to act on the second portion, which pivots the member to the first position.

Figure 6:
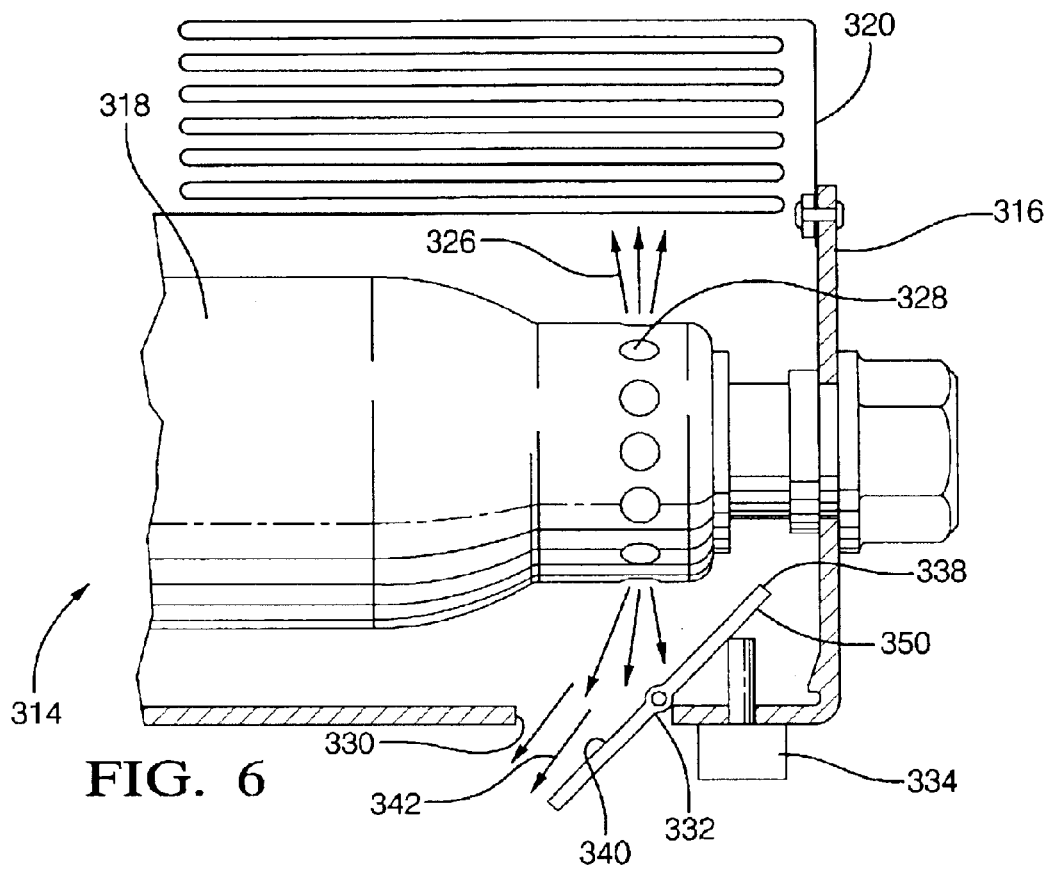
FIG. 6 is a cross sectional view of another alternative exemplary embodiment of an airbag module showing a deflector in a first position.
Figure 7:
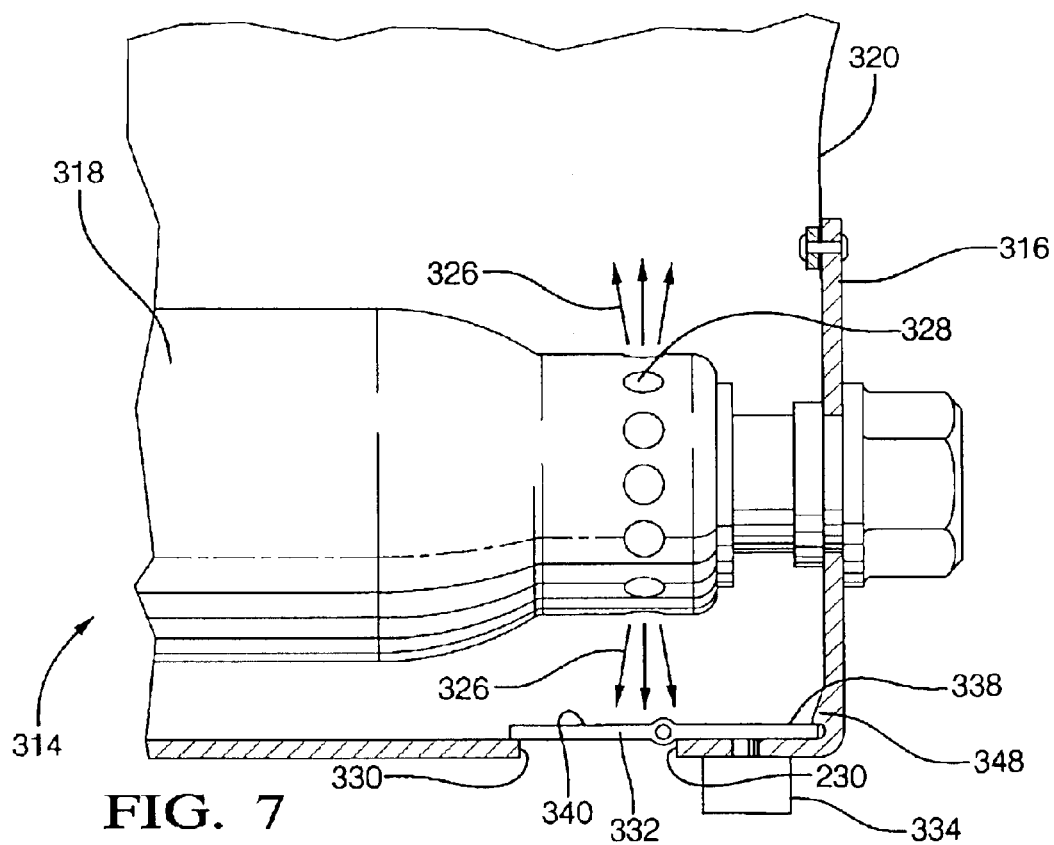
FIG. 7 illustrates the module of FIG. 6 showing the deflector in a second position.

Another alternative exemplary embodiment of an airbag module 314 is illustrated in FIGS. 6–7. In this embodiment, the actuator 334 is configured to push/pull the gas deflecting member 332 between the first position (FIG. 6) and the second position (FIG. 7). Specifically, the actuator 334 includes a member 350 that is moved by the actuator between an extended (FIG. 6) and a retracted position (FIG. 7).

The gas deflecting member 332 is pivoted to the first position by extending the member 350 of the actuator 334. Conversely, the gas deflecting member 332 is pivoted to the second position by retracting the member 350 of the actuator 334.

The exemplary embodiments of the airbag module are described above by way of example only as finding use with a single stage inflator. Of course, it is contemplated for the airbag module to be used in conjunction with multilevel inflators. It should also be noted that the airbag module of the present disclosure can find use with other airbag systems. For example, it is contemplated to combine the airbag module with releasable cushion tethers and others.

The airbag modules achieve multiple levels of inflation through the interaction of the inflation gas with a deflector shield, which redirects the inflation gas out of the housing. The airbag module of the present disclosure allows the same vent aperture to be used for releasing high-pressure gas (e.g., gas directly from the inflator) and low-pressure gas (e.g. gas that filled the cushion but is pushed out later during ride down). In addition, the air bag module does not require the vent aperture to be aligned with the exhaust ports of the inflator. Rather, the deflector is sized, positioned, and configured to deflect the desired quantity of inflation gas from the exhaust ports to the vent aperture.

Another advantage of the module of the present disclosure is that the gas deflecting member is not required to slide over top of the vent aperture.

In addition, closing the vent aperture through a rotation of the gas deflecting member provides design improvements. For example, closing the vent aperture through a rotation of the gas deflecting member reduces friction forces associated with closing the aperture. This also allows the gas deflecting member to be positioned such that the inflation gas aids in the pivoting of the gas deflecting member. Both of which can result in a smaller actuator being required.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An airbag module, comprising:

a housing;

an inflator having one or more exhaust ports in fluid communication with an interior of said housing, said inflator being configured to provide a quantity of inflation gas from said exhaust ports;

an inflatable cushion in fluid communication with said interior such that said quantity of inflation gas causes said inflatable cushion to inflate and deploy from said housing;

a vent aperture defined in said housing, said vent aperture placing said interior of said housing in fluid communication with an exterior of said housing, said vent aperture being offset from said exhaust ports such that said quantity of inflation gas is not directed from said exhaust ports towards said vent aperture; and a gas deflecting member being movable between a first position and a second position, said gas deflecting member being positioned such that said quantity of inflation gas is directed from said exhaust ports towards said gas deflecting member, a first portion of said gas deflecting member being configured to deflect a first amount of said quantity of inflation gas to said exterior of said housing through said vent aperture when said gas deflecting member is in said first position, a second portion of said gas deflecting member being configured to deflect said quantity of inflation gas towards said inflatable cushion when said gas deflecting member is in said second position, a second amount of said quantity of inflation gas being ventable from said housing through said vent aperture when said gas deflecting member is in said second position, wherein said second amount is less than said first amount.

2. The airbag module as in claim 1, wherein said inflatable cushion has a higher inflation level when said gas deflecting member is in said second position than when said gas deflecting member is in said first position.

3. The airbag module as in claim 2, wherein said gas deflecting member is initially in either said first position or said second position.

4. The airbag module as in claim 1, wherein said gas deflecting member is slidably mounted to said housing such that it slides between said first and second positions.

5. The airbag module as in claim 4, wherein said vent aperture and said exhaust ports are angularly offset from one another.

6. The airbag module as in claim 1, wherein said gas deflecting member is pivotally mounted to said housing such that it pivots between said first and second positions.

7. The airbag module as in claim 6, wherein said vent aperture and said exhaust ports are linearly offset from one another.

8. The airbag module as in claim 6, wherein said gas deflecting member closes said vent aperture in said second position.

9. The airbag module as in claim 1, further comprising an actuator being configured to move said gas deflecting member between said first position and said second position.

10. The airbag module as in claim 9, wherein said quantity of inflation gas directed at said first portion aids said actuator in moving said gas deflecting member from said first position to said second position.

11. The airbag module as in claim 1, further comprising a locking member for locking said gas deflecting member in a desired position.

12. A method of varying an inflation level of an airbag module's inflatable cushion, comprising:

deflecting an inflation gas by moving a gas deflecting member between a first position and a second position, a first portion of said gas deflecting member deflecting a first amount of said inflation gas from the airbag module through a vent aperture when said gas deflecting member is in said first position, a second portion of said gas deflecting member deflecting said inflation gas towards the inflatable cushion when said gas deflecting member is in said second position, a second amount of said inflation gas being ventable through said vent aperture when said gas deflecting member is in said second position, wherein said first amount is greater than said second amount.

13. The method as in claim 12, wherein the inflatable cushion has a higher inflation level when said gas deflecting member is in said second position than when said gas deflecting member is in said first position.

14. The method as in claim 13, wherein said gas deflecting member is pivotally mounted to said housing such that it pivots between said first and second positions.

15. The method as in claim 14, wherein said gas deflecting member is initially in said first position and is pivoted to said second position.

16. The method as in claim 14, wherein said gas deflecting member closes said vent aperture in said second position.

17. The method as in claim 13, wherein said gas deflecting member is slidably mounted to said housing such that it slides between said first and second positions.

18. The method as in claim 17, wherein said gas deflecting member is initially in said first position and is slid to said second position.

19. The method as in claim 12, further comprising activating an actuator to move said gas deflecting member.

20. The method as in claim 19, further comprising locking said gas deflecting member in a desired position after the gas deflecting member has been moved.

* * * * *